United States Patent [19]

Nemeth

[11] 4,057,237
[45] Nov. 8, 1977

[54] SNUBBER

[75] Inventor: Joseph Daniel Nemeth, Clinton, Ohio

[73] Assignee: The Babcock & Wilcox Company, New York, N.Y.

[21] Appl. No.: 687,712

[22] Filed: May 19, 1976

[51] Int. Cl.² .............................................. F16F 1/00
[52] U.S. Cl. .................................. 267/134; 188/1 B; 248/18; 248/54 R
[58] Field of Search .............. 267/8 R, 9 R, 9 C, 10, 267/69, 70, 73, 134, 136, 138; 24/134 N; 188/1 B, 129; 213/37; 248/15, 18, 54 R, 54 CS

[56] References Cited

U.S. PATENT DOCUMENTS

| 1,065,222 | 6/1913 | Conley | 24/134 N X |
| 1,812,240 | 6/1931 | Hottmann | 267/138 |
| 2,701,629 | 2/1955 | Cairnes et al. | 188/129 |
| 2,723,114 | 11/1955 | Dentler | 267/134 |
| 3,455,527 | 7/1969 | Suozzo | 248/54 R |
| 3,804,447 | 4/1974 | Slavin | 267/9 C X |
| 3,866,720 | 2/1975 | Wallerstein | 188/67 |

Primary Examiner—Johnny D. Cherry
Attorney, Agent, or Firm—J. Maguire; R. J. Edwards

[57] ABSTRACT

An illustrative embodiment of the invention relates to a mechanical shock suppressor sensitive to velocity or acceleration of a predetermined level capable of restraining relative movement associated therewith of structures supported by the suppressor. The suppressor comprises frictional engaging portions having compressive means disposed thereon which increase the frictional restraining force only during movements of a predetermined level.

3 Claims, 4 Drawing Figures

SNUBBER

BACKGROUND OF THE INVENTION

1. Field of the Invention

This invention relates to shock suppressors and, more particularly, to a velocity sensitive mechanical snubber.

2. Description of the Prior Art

In many applications there is a need to restrain, minimize or suppress the movement of equipment and piping, relative to its supporting enclosure, resulting from disturbing forces such as flow pulsation, sway, pipe rupture thrust and seismic movement. This restraint or shock suppression, moreover, must be provided during disturbances of high velocity movement or acceleration whereas, during normal thermal movement, expansion or contraction, the low velocity movement associated therewith must be permitted.

More specifically in commercial power generating plants there is a need for shock suppressors which when subjected to disturbing forces of a predetermined minimum level, will act as a stiff strut or support to prevent relative movement between the equipment or piping attached thereto and the building or power plant structure. For example, from a safety viewpoint it is desirable to prevent a ruptured pipe from whipping about the interior of the power plant building. Furthermore, in order to readily calculate the safe design of a nuclear power plant subject to seismic disturbances, it is also desirable to fixedly connect the equipment and piping within the power plant building to the building structure to prevent relative motion between the moving building and the equipment therein. In addition, because of the large structures and temperatures involved in commercial power plants thermal expansion and contraction on the order of several inches may result. In view of the disturbing forces which may act upon the equipment and piping within the power plant and the thermal movements associated with the operation of the power plant a shock suppressor or restraint which will serve as a stiff high spring rate strut in response to a high reaction velocity movement and which will also serve to allow thermal movement is believed to be necessary.

Shock suppressors or dampers generally encompass hydraulic-piston type dampers, spring dampers and mechanical i.e., frictional, suppressors. More particularly, the mechanical suppressors generally comprise a linearly moving portion coupled to spring and rotating friction portions which provide the mechanical restraint. All of the above devices, moreover, generally consist of reservoirs and valves, or screwnut assemblies, centering springs and friction plates and are usually elaborate, expensive, high tolerance structures difficult to repair assemble and inspect, some even having orientation restrictions.

Accordingly, there is a need to provide a rugged shock suppressor which acts as a rigid strut with a high overall spring rate capable of resisting an externally imposed disturbance while permitting relatively low velocity movement such as thermal expansion and contraction and which is also simple and economical (low tolerance) in design, easy to inspect and assemble and is not orientation restricted.

SUMMARY OF THE INVENTION

In accordance with this invention a snubber or shock suppressor is provided which allows expansion and contraction due to thermal movements and the like and which restrains or suppresses sudden high velocity movements or accelerations of a minimum predetermined level.

Specifically, a mechanical, frictional snubber according to this invention includes a pair of opposing structural members or main links having portions in frictional slideable engagement with each other. Moreover, high velocity disturbances increase the frictional restraining force of the suppressor by means of a compressing force acting on the frictionally engaging surfaces, which proportionately increases the resulting frictional restraining force. That is, the snubber includes compressive means disposed on each of the main links in opposing relation to each other and opposite the sliding engagement of the main links. Each of the compressive means, moreover, is moveably connected to its respective opposite main link in such a manner as to provide a compressive force between the sliding main links during a high velocity movement, which proportionately increases the frictional force between the main links. And, in addition, the compressive means are each connected to both main links in such a manner as to allow thermal, low velocity movements between the links.

More specifically, the shock suppressor or snubber of this invention includes a body portion, the opposite ends of which are provided with attachment means for fastening one end of the snubber to the building structure and the other end to the equipment or piping. In particular, the snubber comprises a pair of structural members or main links slideably engaged with each other along a longitudinal portion of the links. Furthermore, disposed on each of the structural members on the longitudinal portion opposite the slideably engaged portion is a restraint block or member connected by means of a pneumatic or hydraulic damper to its respective structural member. Moreover, each of the restraint blocks also are connected to the opposite structural member by means of a spring and a pivotally connected link, wherein, the damper and the spring of each restraint block are aligned with the longitudinal axis of the main links in opposing relationship.

The various features of novelty which characterize the invention are pointed out with particularity in the claims annexed to and forming a part of this specification. For a better understanding of the invention its operational advantages and specific objectives attained by its use, reference should be had to the accompanying drawings and descriptive matter in which there is illustrated and described a preferred embodiment of the invention.

DETAILED DESCRIPTION OF THE PREFERRED EMBODIMENTS OF THE INVENTION

For a more complete appreciation of the invention attention is invited to the following description of the invention as shown in the attached drawings.

Figure 1:
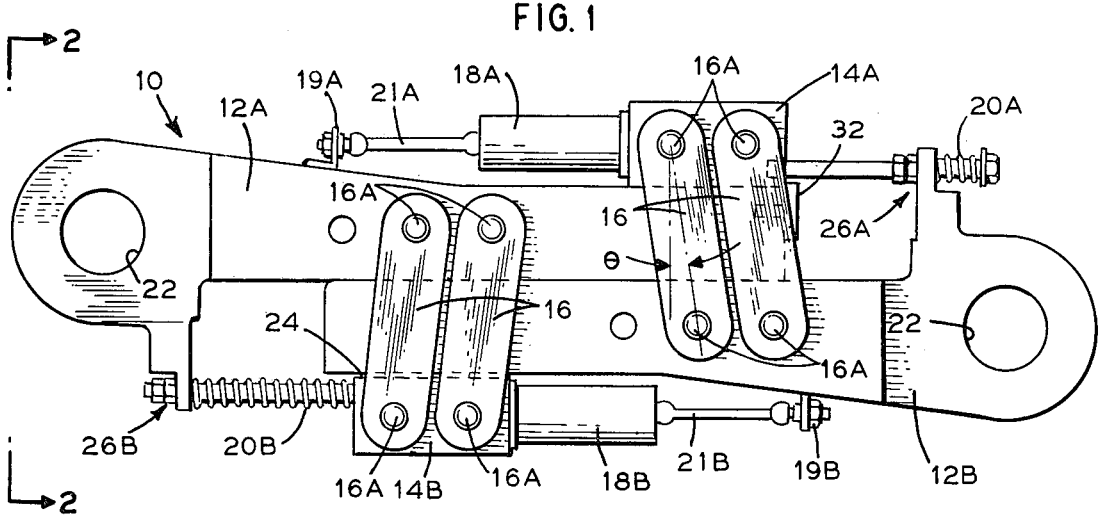
FIG. 1 shows the snubber of this invention.
Figure 2:
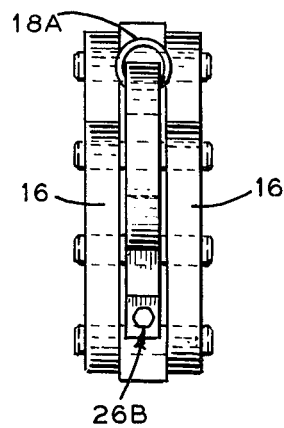
FIG. 2 is an end view in the direction of line 2—2 of FIG. 1.

Referring to FIG. 1 a snubber 10 according to this invention is illustrated having a pair of structural members or main links $12_A$ and $12_B$ disposed in sliding frictional engagement with each other along a longitudinal portion of the links. Disposed on each of the links is compressive means or restraint blocks $14_A$ and $14_B$, each pivotally connected to its respective opposite main link by a plurality of smaller links 16 and pins $16_A$, four of the links 16 are shown in this embodiment of the invention. The restraint blocks $14_A$ and $14_B$, moreover, are each connected to their respective main links $12_A$ and $12_B$ by means of a damper $18_A$ and $18_B$ respectively, and each of the dampers is connected to an anchor $19_A$ and $19_B$ by means of a connecting rod $21_A$ and $21_B$ respectively. In addition, the restraint blocks $14_A$ and $14_B$ are connected to their respective opposite main link by means of springs $20_A$ and $20_B$ respectively.

Furthermore, the damper 18 and spring 20 of each restraint block are connected to the block in opposing relationship. The snubber, moreover, includes attachment means 22 at opposite ends thereof for fixing the snubber between, for example, the building structure and a pipe.

The links 16 are pivotally connected to their respective restraint block and main link at opposite ends of the links 16. Moreover, the length of the links 16 is such that upon compression or tension of the snubber, one of the restraint blocks is pivotally forced into compressive contact with its respective main link while the other restraint block is pivotally forced or rotated away from its respective main link forming a gap 24 therebetween. In addition, adjustment means such as the locked nuts $26_A$ and $26_B$, arranged on the springs $20_A$ and $20_B$ respectively, provide substantially linear adjustment of the gap 24 beneath restraint blocks $14_A$ and $14_B$ respectively.

In operation and during normal low velocity movement such as produced by thermal expansion or contraction of a pipe or a piece of equipment restrained by the snubber 10 of this invention, the dampers $18_A$ and $18_B$ and the springs $20_A$ and $20_B$ will equally oppose each other through the restraint blocks $14_A$ and $14_B$ respectively and will allow free translation of the main links $12_A$ and $12_B$ in either expansion or contraction, in addition, the gap 24 will exist beneath both restraint blocks.

However, during a high velocity movement or acceleration above a predetermined "safe" level in either tension (FIG. 3) or compression (FIG. 4) a high relative velocity will be produced in the dampers $18_A$ and $18_B$. It is noted that the "safe" level is a relative term subject to change and variation. Furthermore, as a result of the high velocity condition produced in the dampers and the damping coefficient of each of the dampers, a force associated with each of the dampers $18_A$ and $18_B$ is imposed on their respective restraint blocks $14_A$ and $14_B$ which is designed for this condition to be greater than the opposing force of the respective springs $20_A$ and $20_B$. Accordingly, the restraint blocks will be pulled and rotated or pushed and rotated depending on whether an expansion or compression force is acting on the snubber.

Figure 3:
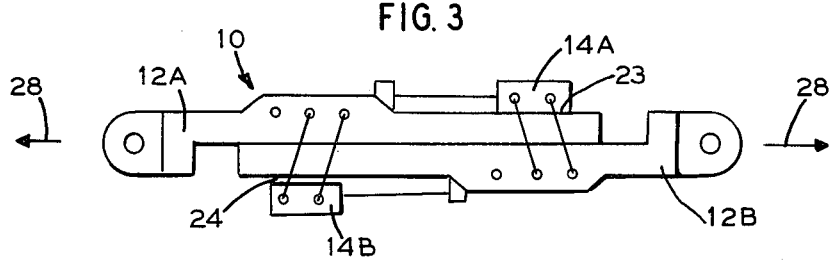
FIG. 3 is a schematic of the principal of operation of this invention when subjected to a tension producing force.

Turning to FIG. 3, a tension or expansion force, as illustrated by arrows 28, is shown acting upon the ends of the snubber 10. As explained above, if the expansion force produces a high velocity or high acceleration greater than a predetermined "safe" level, the dampers $18_A$ and $18_B$ (schematically represented) will produce a sufficient force to overcome the opposing spring force of each respective restraint block and, will pull, rotate and force one of the restraint blocks $14_A$ (FIG. 3) into forced compressive contact 23 (FIG. 3) with its respective main link $12_A$. In like manner restraint block $14_B$ is pulled and rotated away from contact with its respective main link $12_B$ forming a gap 24 (FIG. 3). The springs and block clearance adjustments are not shown in FIG. 3 as they have little function during the representative high velocity tension movement above a predetermined "safe" level.

The extension of the main links $12_A$ and $12_B$ as shown in FIG. 3 results in the compressive contact of the restraint block $14_A$ with its main link $12_A$ causing a self-tightening action compressing the main link $12_A$ into forced frictional engagement with its respective restraint block $14_A$ and also the other main link $12_B$. Furthermore, this compressive force proportionately increases the frictional restraining force between the moving main links $12_A$ and $12_B$ to a value greater than that of the tension force acting on the snubber 10. Accordingly, no further movement of the main links is permitted, that is, the snubber has effectively become a rigid strut and therefore further movement of the equipment or piping supported thereby is prevented.

Figure 4:
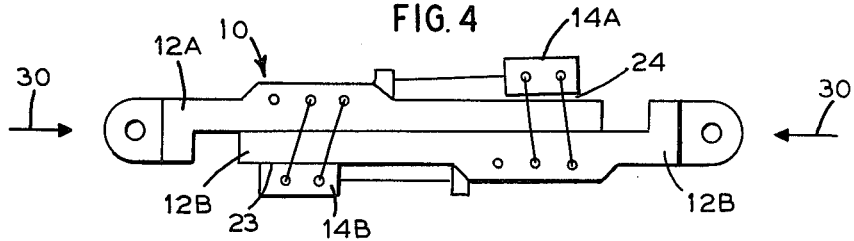
FIG. 4 is a schematic of the principle of this invention when subjected to a compression producing force.

FIG. 4 illustrates the snubber 10 of this invention subject to a compressive force 30 greater than that of the predetermined "safe" level and illustrates the self-tightening action of the snubber of this invention or, more particularly, the self-tightening action of the restraint block $14_B$ on its main link $12_B$ in like manner as described above in connection with FIG. 3 and a tension force.

In addition, means such as a tab 32 is provided at the restraint block end of main link $12_A$ positioned to contact restraint block $14_A$ to insure contact between the restraint block and main link $12_A$ to prevent the assembly from coming apart during a greater-than-normal thermal movement. Furthermore, selective selection of the size and material of the parts of the snubber, of the size and force levels of the dampers and springs and of the contact angle $\theta$ (FIG. 1) of the links 16 with a line perpendicular to the contact surfaces of the restraint block with its respective main link will produce a rugged shock suppressor or snubber capable of restraining cyclic and/or unidirectional high velocity movement or accelerations of a predetermined level and which will also allow low velocity thermal movements. In addition, the simple design of the snubber of this invention results in an economical, easy to inspect and assemble high spring rate snubber which is not orientation restricted.

I claim:

1. A snubber comprised of a pair of elongated members engaged in sliding frictional contact with one another, each member having an adjacently disposed restraining device, and means for connecting the device to the adjacent member and to the other member, the connecting means including means for pivotally linking the device to said other member.

2. A snubber according to claim 1 including resilient means disposed between the restraining device and said other member.

3. A snubber according to claim 1 including damper means disposed between the restraining device and the member adjacent thereto.

* * * * *